United States Patent [19]

Miller

[11] 4,269,763

[45] May 26, 1981

[54] METHOD FOR THE PRODUCTION OF LOW MELTING RING ALKYLATED DIPHENYL-PARA-PHENYLENEDIAMINES

[75] Inventor: Donald E. Miller, Akron, Ohio

[73] Assignee: The Goodyear Tire & Rubber Company, Akron, Ohio

[21] Appl. No.: 132,598

[22] Filed: Mar. 21, 1980

[51] Int. Cl.$^3$ .............................................. C08K 5/18
[52] U.S. Cl. ............................................ 260/45.9 QB
[58] Field of Search ......................... 260/45.9 QB, 576

[56] References Cited

U.S. PATENT DOCUMENTS 3,432,460   3/1969   Spacht .......................... 260/45.9 QB

*Primary Examiner*—V. P. Hoke
*Attorney, Agent, or Firm*—D. O. Nickey

[57] ABSTRACT

There is disclosed ring alkylated diphenyl-para-phenylenediamines melting at 60° C. or less and their use in the stabilization of polymers.

4 Claims, 1 Drawing Figure

U.S. Patent
May 26, 1981
4,269,763
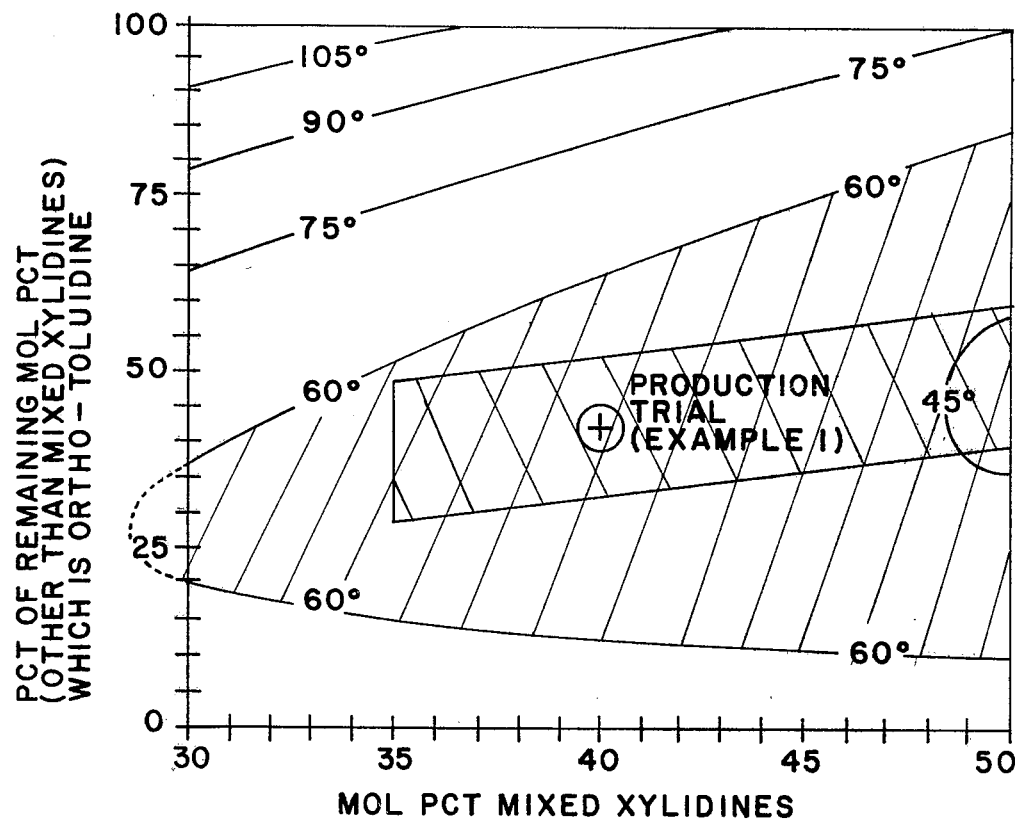
TEMPERATURES EXPRESSED ARE MINIMUM CRYSTALLIZATION TEMPERATURE IN DEGREES CENTIGRADE.

METHOD FOR THE PRODUCTION OF LOW MELTING RING ALKYLATED DIPHENYL-PARA-PHENYLENEDIAMINES

TECHNICAL FIELD

Preparation of low melting mixtures of ring alkylated diphenyl-para-phenylenediamines and their use in the stabilization of polymers, the preparation consisting of reacting in the presence of a condensation catalyst, one mole of hydroquinone with from 2.0 to 2.5 moles of an amine mixture, the improvement comprising all amine mixtures defined by the equation:

melting point $= 64.85 + 0.1496x - 0.01307y - 0.001245x^2 + 0.011403y^2 - 0.022xy$;

wherein the melting point is 60° C., or less and x is mole percent of mixed xylidines, $[(y/100)(100-x)]$ is mole percent of ortho toluidine and $\{100-[x+y(100-x)/100]\}$ is mole percent aniline, and wherein the mole percent of mixed xylidines is less than 50.

BACKGROUND ART

This invention relates to stabilizers for rubbers and is particularly concerned with the production of ring alkylated diphenyl-para-phenylenediamines as stabilizers for oxidizable diene rubbers.

The deleterious effects of ozone and oxygen on rubber articles is well-known and many antiozonants and antioxidants have been prepared which are capable of protecting various rubber compositions from the deleterious effects of ozone and oxygen. Many phenolic compositions and amine compositions have been used as antioxidants for rubber for a considerable period of time.

One of the more widely accepted stabilizers in the industry at present is diaryl-para-phenylenediamine as disclosed by Ronald Spacht in U.S. Pat. No. 3,432,460. The present invention relates to an improved method for the production of stabilizers disclosed in U.S. Pat. No. 3,432,460. The teachings of U.S. Pat. No. 3,432,460 are herein incorporated by reference.

As disclosed in U.S. Pat. No. 3,432,460 diaryl-para-phenylenediamines have been used as antiozonants and antioxidants for rubber, however, compounds of this class are in general solids which completely melt at temperatures in the neighborhood of 100° C. or higher and which have only limited solubility in aqueous mediums and aliphatic hydrocarbons, and particularly rubber. They are thus quite difficult to incorporate in rubber without employing comparatively high temperatures, aromatic solvents, or vigorous milling action. Particular difficulties are encountered when incorporating high melting diaryl-para-phenylenediamines in latices and raw polymers.

DISCLOSURE OF INVENTION

Preparation of low melting mixtures of ring alkylated diphenyl-para-phenylenediamines consists of reacting in the presence of a condensation catalyst one mole of hydroquinone or ring alkylated hydroquinone with from 2.0 to 2.5 mole of an amine mixture:

The improvement comprising an amine mixture of o-toluidine, mixed xylidines and aniline where all the amine mixture ratios are defined by the equation:

melting point $= 64.85 + 0.1496x - 0.01307y - 0.001245x^2 + 0.011403y^2 - 0.022xy$;

wherein the melting point is 60° C. or less and x is the mole percent mixed xylidines, $[(y/100)(100-x)]$ is the mole percent o-toluidine and $\{100-[x+y(100-x)/100]\}$ is the mole percent aniline, and wherein the mole percent of mixed xylidines is less than 50.

The present invention provides ring alkylated diphenyl-para-phenylenediamines which have increased solubility in rubber and organic solvents used in the preparation of various synthetic rubbers. In addition, this invention provides alkylated diphenyl-para-phenylenediamines with low melting points, which therefore emulsify easily, thus greatly facilitating their incorporation in rubber latices.

More specifically, the invention is directed to mixed alkyl substituted diphenyl-para-phenylenediamines melting below 60° C.

Compounds prepared according to the present invention conform to the following general formula:

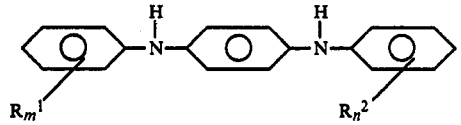

wherein $R^1$ and $R^2$ are selected from hydrogen or methyl radicals and wherein m and n are integers ranging from 0 to 2 and wherein the sum of m and n range from 0 to 4.

MORE DETAILED DISCLOSURE

The low melting alkylated diphenyl-para-phenylenediamines which are prepared by the practice of this invention have melting points less than 60° C. These antioxidants are prepared by reacting in the presence of a condensation catalyst, one mole of hydroquinone with from 2.0 to 2.5 moles of the following preferred amine mixture ranges:

35±10 mole percent aniline
25±10 mole percent o-toluidine
40+10 or −5 mole percent mixed xylidines Low melting alkylated diphenyl-para-phenylenediamines may also be prepared by reacting para aminophenols with the amine mixture listed above providing the proportions of amines in the mixture are doubled so that a total of from 4 to 5 moles of the amine mixture are used per mole of para-aminophenol.

Because the diaryl-phenylenediamines disclosed by the prior art as rubber stabilizers are relatively high melting solids having very limited solubility in aqueous mediums and in aliphatic organic solvents and rubber, they are quite difficult to incorporate into rubber latices.

U.S. Pat. No. 3,432,460 stresses the point that the 19 amine charge ratios claimed provide low melting alkyl substituted diphenyl-para-phenylenediamines which are much more soluble in various solvents and in rubber.

Neither U.S. Pat. No. 3,432,460 or other publications disclose or suggest an amine charge ratio as defined in the equation:

melting point $= 64.85 + 0.1496x - 0.01307y - 0.001245x^2 + 0.011403y^2 - 0.022xy$;

wherein the melting point is 60° C. or less and x is mole percent of mixed xylidines, [(y/100)(100−x)] is mole percent of ortho toluidine and {100−[x+y(100−x)/100]} is mole percent aniline, and wherein the mole percent of mixed xylidines is less than 50 for the preparation of low melting alkyl substituted diphenyl-para-phenylenediamines. U.S. Pat. No. 3,432,460 discloses 19 specific amine mixtures but does not discuss or disclose the amine mixture of the present invention.

One skilled in the art would not expect the amine charge ratios of the present invention to produce a low melting composition since a complex p-phenylenediamine mixture, produced from a complex mixture of mixed toluidine isomers and xylidine isomers, as taught by U.S. Pat. No. 3,432,460, is required to produce the low melting antioxidant.

The antioxidants disclosed in U.S. Pat. No. 3,432,460 have been marketed for a number of years as Wingstay ®200 (Wingstay ® is a trademark of Goodyear Tire & Rubber Company and 200 stands for low melting alkylated diphenyl-para-phenylenediamines). When first introduced, Wingstay ®200 was manufactured using a 50—50 molar blend of mixed toluidines and mixed xylidines. Several times since initial manufacture, the amine raw materials have been changed. One variation utilized 12½ percent aniline, that material being used for cost reasons. The use of aniline was later discontinued due to a shortage of supply and the mixed amine streams themselves have changed isomer ratios several times as the manufacturer's processes have been modified.

Presently, the mixed toluidines and mixed xylidines which are available in the market place have the following approximate isomeric ratios.

| Mixed Toluidines | |
|---|---|
| o-toluidine | 55–65% |
| p-toluidine | 30–40% |
| m-toluidine | 3–7% |
| Mixed Xylidines | |
| 2,4-xylidine | 40–10% |
| 2,5-xylidine | 25% max. |
| 2,6-xylidine | 20% max. |
| Other isometric xylidines | 35% max. |
| ar-ethylanilines | 15% max. |

Although the work performed and examples cited which are pertinent to this invention were based on compositions of mixed toluidines and mixed xylidines similar to those above, one skilled in the art would not expect variations in the isomer ratios to greatly alter the melting point of the antioxidant product.

It is of importance that all of the isomer ratios utilized over the years in the production of Wingstay ®200 are comprised of highly mixed amines. Even during the period where aniline, a single chemical structure was employed, it was used in a relatively small percentage with mixed toluidines and mixed xylidines. This has always been done to ensure that a sufficient number of different p-phenylenediamine structures were formed such that they mutually depressed each others melting points in order to produce a low melting mixture.

The prior art or past methods of production, do not suggest or disclose that a three component amine mixture, wherein two of the components have but a single chemical structure, would produce a p-phenylenediamine mixture having a melting point of 60° C. or less.

It has been found that performance of the antioxidant does not depend on whether the end groups are 2,4-xylyl, 2,5-xylyl, phenyl, m-tolyl, o-tolyl, etc. However, physical form of the antioxidant must be carefully considered when a change is made. Since Wingstay ®200 is used as a liquid, the melting point, or more specifically, the minimum crystallization temperature is of major importance.

In order to determine the melting point of the antioxidants produced by the process of this invention, between 5 and 100 grams of the compound, which had been forced to partially crystallize, was slowly raised in temperature. The recorded melting point was the temperature at which the last trace of solid disappeared from the sample. In all cases this temperature was higher than the temperature at which the product first became fluid.

An important fact in the present invention is the cost of the amines. At present the mixed xylidines are the highest in cost, with mixed toluidine slightly less, however, in comparison, o-toluidine and aniline are considerably lower in price per pound than the mixed amino types. As a result of these cost differentials the use of o-toluidine and/or aniline in a significant percentage will result in substantial savings.

In order to evaluate the utilization of the maximum amounts of the lower cost amines, a series of experiments were performed. These are described in Experiments 1 and 2 which follow. In these experiments diaryl-p-phenylenediamine antioxidant-antiozonants were prepared and evaluated for their minimum crystallization temperatures. Costs for the products were also calculated. In all cases the p-phenylenediamine antioxidant-antiozonants were prepared and tested using essentially the same procedures.

BRIEF DESCRIPTION OF DRAWING

The invention is more easily understood from the accompanying drawing which is a graph on which contour lines represent the combined values of "x" and "y", the use of which will result in that particular minimum crystallization temperature represented by the contour lines.

PROCEDURE FOR PREPARATION

Three moles (330 grams) of hydroquinone was reacted in a suitable reaction vessel with 2.5 moles of the amine mixture being evaluated. A small amount of toluene was employed to remove the water of condensation azeotropically. Fifteen grams of anhydrous ferric chloride was added to the reaction mixture as a condensation catalyst. The reaction flask was equipped with a reflux condenser and a water trap to remove $H_2O$ as fast as it was formed by the condensation of the amines and the hydroquinone. The reaction mixture was gradually heated to a temperature of 250° C. and maintained at this temperature for 4 hours. Upon completion of the reaction as indicated by the recovery of approximately 6 moles of water of condensation, the reactants were cooled and a saturated water solution of $Na_2CO_3$ was added to destroy the catalyst. The reaction mixture was then heated to 250° C. at 5 millimeters pressure to remove volatiles. The product was filtered while still hot to remove inorganic salts.

PROCEDURE FOR TESTING

Two properties were evaluated in order to define the useful limits of the present invention: material cost and TABLE II-continued

| Composition Number | "x" Mole % Mixed Xylidines | "y" % of 100-x which is o-toluidine | [(y/100)(100-x)] Mole% o-toluidine | {100-[x-y(100-x)/100]}Mole% Aniline | Minimum Crystallization Temperature |
|---|---|---|---|---|---|
| 6 | 30 | 75 | 52.5 | 17.5 | 98 |
| 7 | 40 | 50 | 30 | 30 | 48 |
| 8 | 40 | 50 | 30 | 30 | 60 |

Compositions number 7 and 8 are duplicates which constitute the center point of the design.

The results from Table II were analyzed using a computer programmed to fit a second order equation establishing the relationship between the minimum crystallization temperature and values of "x" and "y". The equation obtained was:

Minimum Crystallization
Temperature $= 64.85 + 0.1496x + 0.01307y - 0.001245x^2 + 0.011403y^2 + 0.022xy$ where x and y are defined as above.

The analysis was also expressed using a method of expression known as a contour plot. The particular contour plot for this experiment is attached. Each contour line on this chart represents the combined values of "x" and "y", the use of which the equation predicts will result in that particular minimum crystallization temperature.

One experienced in the art will recognize that in order to be readily emulsifiable in water for addition to latex, an antioxidant-antiozonant composition should be a true noncrystalline liquid at all temperatures above about 60° C. Using the equation developed in this example the values of "x" and "y" within the limits of the experimental region which will produce a composition with minimum crystallization temperature below 60° C. can be readily defined. The values of "x" and "y" for this selected region will satisfy the expression.

$64.85 + 0.1496x + 0.01307y - 0.001245x^2 + 0.011403y^2 + 0.022xy \geq .,$ and where $x \geq 50$.

This region is designated on the chart as that enclosed by the 60° C. contour line and the absicca value of x=50. A small portion of the region enclosed by the 60° C. contour line is excluded from FIG. 1 where that contour extends to abscissa values of x=less than 30.

BEST MODE FOR CARRYING OUT THE INVENTION

EXAMPLE I

In order to take advantage of the cost improvements provided by the invention, a batch of antioxidant-antiozonant was manufactured in a production scale facility using an amine composition selected from the desirable region defined by Experiment 2. The procedure used for that batch was as follows:

Hydroquinone, in a volume such that it took up approximately 14.7% of the total reactor volume was reacted in a production sized autoclave with a mixture of amines in a molar ratio of 2.2/1, amine/hydroquinone. The amine mixture was comprised of 35 mole percent aniline, 25 mole percent ortho-toluidine and 40 mole percent mixed xylidines. Along with the amines and hydroquinone were charged per mole of hydroquinone 0.2151 moles of toluene and 0.0275 moles of a condensation catalyst, ferric chloride. The reactor was sealed and the temperature raised toward a set point in the range of 260° to 320° C. When the pressure in the reactor reached approximately 90 pounds per square inch, gasses were allowed to escape from the reactor where they were recovered and condensed. Water in the distillate was removed and the remaining mixture consisting of toluene and a mixture of aniline, ortho-toluidine and mixed xylidines were recycled into the reaction. The recycling was carried on continuously until no further water of condensation was obtained. This required approximately 3 to 5 hours of reaction time. The reaction mixture was then cooled and neutralized with a concentrated sodium-carbonate solution. The residual volatile components were removed by heating to 235° to 270° C. at a pressure below 50 millimeters of mercury. The product yield was approximately 75% of the total weight of the reactants charged. The mole percentages of the amines used in the procedure just given are 40 mole percent mixed xylidines, 25 mole percent o-toluidine, and 35 mole percent aniline. The point as designated in units of "x" and "y" is "x"=40 and "y"=41.67. It is shown in FIG. 1 designated "production trial" and lies near the center of the desirable region defined by the 60° C. contour line and the abscissa value of 50 percent. The minimum crystallization temperature of this antioxidant-antiozonant batch was 55°–57° C.

While certain representative embodiments and details have been shown for the purpose of illustrating the invention, it will be apparent to those skilled in the art that various changes and modifications may be made therein without departing from the spirit or scope of the invention.

I claim:

1. An oxidizable diene rubber having incorporated therein an antioxidant/antiozonant in the amount of from 0.25 to 8.0 percent by weight based on the weight of the rubber of a mixture of ring alkylated diphenyl-p-phenylenediamine prepared by reacting in the presence of a condensation catalyst at temperatures from 175°325° C., said reaction involving the continuous removal of water as it is formed, (a) hydroquinone, and (b) 2.0 to 2.5 moles of an amine mixture per mole of (a): the improvement comprising an amine mixture of o-toluidine, mixed xylidines and aniline where all the amine mixture ratios are defined by the equation:

melting
point $= 64.85 + 0.1496x - 0.01307y - 0.001245x^2 + 0.011403y^2 - 0.022xy;$ wherein the melting point is 60° C. or less and x
is the mole percent mixed xylidines, [(y/100)(100−x)]
is the mole percent o-toluidine and {100−[x+y(100−x)]}
is the mole percent aniline, and wherein the mole percent of mixed xylidines is less than 50.

2. The oxidizable diene rubber according to claim 1 wherein the mixture of ring alkylated diphenyl-p-phenylenediamine is prepared by reacting (a) one mole minimum crystallization temperature. Although the cost figures involve simple arithmetic calculations, melting point temperature proved to be difficult to ascertain due to the tendency of p-phenylenediamines to form supercooled liquids. However, a technique was developed whereby the samples were first forced to partially crystallize, then the melting point was determined visually as the temperature was slowly increased.

In order to determine the minimum crystallization temperature of the product, a sample was forced to partially crystallize by lowering the temperature from ambient to approximately 3° C. during a period of 16 to 24 hours.

The temperature of the sample was then adjusted from 3° C. to −7° C. during a period of 16 to 24 hours and then from −7° C. to −18° C. during a 16 to 24 hour period. This procedure was reversed raising and lowering the temperature until at least partial crystallization occurred. The samples were then slowly brought to room temperature while observing the nature of the product as well as its temperature. The temperature just below where crystals visibly disappeared was recorded as the "minimum crystallization" temperature. Samples which still contained crystals at room temperature were placed in a circulating hot air oven, starting 25° C. and increased in 5° C. increments. Crystallization temperature was then defined as the highest temperature at which crystalline particles were still visible.

Because of the tendency of diaryl-p-phenylenediamine mixtures to supercool, the minimum crystallization temperatures determined by this method are approximations prone to the subjective judgment of the technician performing the test. Throughout the work cited in the examples, the minimum crystallization temperatures were all determined by the same person thereby increasing their significance. Even so, a small degree of test error must be expected in the measurements. This error is likely to be the greatest for mixtures having the lower minimum crystallization temperatures.

EXPERIMENT NO. 1

The first experiment evaluated the use of four amines: o-toluidine, aniline, mixed xylidines and mixed toluidines. Since the sum of the mole percentages of these four components must equal 100, only three of them could be independently varied. The three independent variables chosen for the experiment were o-toluidine, aniline, and mixed xylidines. The mole percent of mixed toluidines was then the remainder of the amines to 100 percent. A second order balanced experimental design was chosen to explore the relationship of the minimum crystallization temperature to the variables. All of the eleven antioxidant-antiozonant compositions were prepared using the Procedure for Preparation described earlier and were tested according to the Procedure for Testing. In Table I, which follows, are listed the amine variables used along with the minimum crystallization temperatures measured for the eleven antioxidant-antiozonant compositions formed from the amine ratios listed.

TABLE I

| Composition Number | Mole % Aniline | Mole % o-Toluidine | Mole % Mixed Xylidines | Mole % Mixed Toluidines (by difference from 100%) | Minimum Crystallization Temperature |
| --- | --- | --- | --- | --- | --- |
| 1  | 25.0  | 25.0  | 46.67 | 3.33  | 55° C. |
| 2  | 25.0  | 25.0  | 20.0  | 30.00 | 90°    |
| 3  | 17.93 | 17.93 | 26.67 | 37.47 | 110°   |
| 4  | 17.93 | 32.07 | 26.67 | 23.33 | 90°    |
| 5  | 32.07 | 17.93 | 26.67 | 23.33 | 70°    |
| 6  | 32.07 | 32.07 | 26.67 | 9.19  | 90°    |
| 7  | 25.0  | 35.0  | 40.0  | 0.0   | 70°    |
| 8  | 25.0  | 15.0  | 40.0  | 20.0  | 40°    |
| 9  | 35.0  | 25.0  | 40.0  | 0.0   | 3°     |
| 10 | 15.0  | 25.0  | 40.0  | 20.0  | 50°    |
| 11 | 25.0  | 25.0  | 33.33 | 16.67 | 70°    |

It was observed that, unexpectedly, composition number 9 which utilized no mixed toluidines but was made using 35 mole percent aniline, 25 mole percent o-toluidine and 40 mole percent mixed xylidines yielded an unusually low minimum crystallization temperature of 3° C.

EXPERIMENT NO. 2

The second experiment consisted of a balanced second order design in two variables which expressed the effects produced by three amine reactants; aniline, o-toluidine, and mixed xylidines. For the experiment the independent variables x and y are defined as follows:

"x" is the mole percent of mixed xylidines which is 50 percent or less.

"y" is the percentage of the remaining mole percent of amines (other than mixed xylidines) that is the percentage of (100−x) which is o-toluidine.

With these independent variables so defined, the mole percent of o-toluidine becomes equal to the expression $[(y/100)(100-x)]$. Similarly, the mole percent of aniline becomes $\{100-[x+y(100-x)/100]\}$.

As in Experiment No. 1 the preparation and testing was performed as previously described. This experiment consisted of eight batches described in Table II along with their minimum crystallization temperatures.

TABLE II

| Composition Number | "x" Mole % Mixed Xylidines | "y" % of 100-x which is o-toluidine | [(y/100)(100-x)] Mole% o-toluidine | {100-[x-y(100-x)/100]}Mole% Aniline | Minimum Crystallization Temperature |
| --- | --- | --- | --- | --- | --- |
| 1 | 40 | 100 | 60   | 0    | 85 |
| 2 | 50 | 75  | 37.5 | 12.5 | 63 |
| 3 | 50 | 25  | 12.5 | 37.5 | 38 |
| 4 | 40 | 0   | 0    | 60   | 80 |
| 5 | 30 | 25  | 17.5 | 52.5 | 48 | of hydroquinone, and (b) with from 2.0 to 2.5 moles of an amine mixture:

the improvement comprising an amine mixture of o-toluidine, mixed xylidines and aniline, said amine mixture containing 35±10 mole percent aniline
25±10 mole percent o-toluidine
40+10 or −5 mole percent mixed xylidines.

3. An oxidizable diene rubber having incorporated therein an antioxidant/antiozonant in the amount of from 0.25 to 8.0 percent by weight based on the weight of the rubber of a mixture of ring alkylated diphenyl-p-phenylenediamine prepared by reacting in the presence of a condensation catalyst at temperatures from 175° to 325° C., said reaction involving the continuous removal of water as it is formed, (a) p-aminophenol, and (b) 4.0 to 5.0 moles of amine mixture per mole of (a):

the improvement comprising an amine mixture of o-toluidine, mixed xylidines and aniline where all the amine mixture ratios are defined by the equation:

$$\text{melting point} = 64.85 + 0.1496x + 0.01307y - 0.001245x^2 + 0.011403y^2 - 0.022xy;$$

wherein the melting point is 60° C. or less and $x$ is the mole percent mixed xylidines $[(y/100)(100-x)]$ is the mole percent o-toluidine and $\{100-[x+y(100-x)]\}$ is the mole percent aniline, and wherein the mole percent of mixed xylidines is less than 50.

4. The oxidizable diene rubber according to claim 3 wherein the mixture of ring alkylated diphenyl-p-phenylenediamine is prepared by reacting (a) one mole of p-aminophenol, and (b) from 4.0 to 5.0 moles of an amine mixture:

the improvement comprising an amine mixture of o-toluidine, mixed xylidines and aniline, said amine mixture containing 35±10 mole percent aniline
25±10 mole percent o-toluidine
40+10 or −5 mole percent mixed xylidines.

* * * * *